United States Patent [19]

MacGregor et al.

[11] 4,407,723

[45] Oct. 4, 1983

[54] ABSORPTION OF CARBON DIOXIDE

[75] Inventors: Clive D. R. MacGregor, Tantallon; William G. Forsyth, Halifax, both of Canada

[73] Assignee: Her Majesty the Queen in right of Canada, as represented by the Minister of National Defence, Ottawa, Canada

[21] Appl. No.: 356,035

[22] Filed: Mar. 8, 1982

[30] Foreign Application Priority Data

May 27, 1981 [CA] Canada ................................ 378468

[51] Int. Cl.$^3$ .............................................. C09K 3/00
[52] U.S. Cl. ................................. 252/192; 128/201.25; 252/190; 427/424; 427/427; 428/403; 428/696; 428/697; 428/699
[58] Field of Search .................. 427/215, 427, 424, 3; 252/461, 441, 190, 192; 128/201.25; 428/403, 696, 697, 699

[56] References Cited

U.S. PATENT DOCUMENTS

| | | | |
|---|---|---|---|
| 1,333,524 | 3/1920 | Wilson | 252/192 |
| 1,872,026 | 8/1932 | Carey et al. | 252/192 |
| 2,997,445 | 8/1961 | Nuhn | 252/192 |
| 3,847,837 | 12/1974 | Boryta | 252/192 |
| 4,233,175 | 11/1980 | Delmon et al. | 252/190 |

Primary Examiner—Norman Morgenstern
Assistant Examiner—Janyce A. Bell
Attorney, Agent, or Firm—Cushman, Darby & Cushman

[57] ABSTRACT

The invention disclosed is a novel method of making an improved carbon dioxide absorbing material. A primary carbon dioxide absorbent is employed, specifically a group IA and IIA metal hydroxide, and various combinations of additives which modify the properties of the primary absorbent, in the form of an aqueous solution, and sprayed onto the surface of the primary absorbent.

10 Claims, 2 Drawing Figures

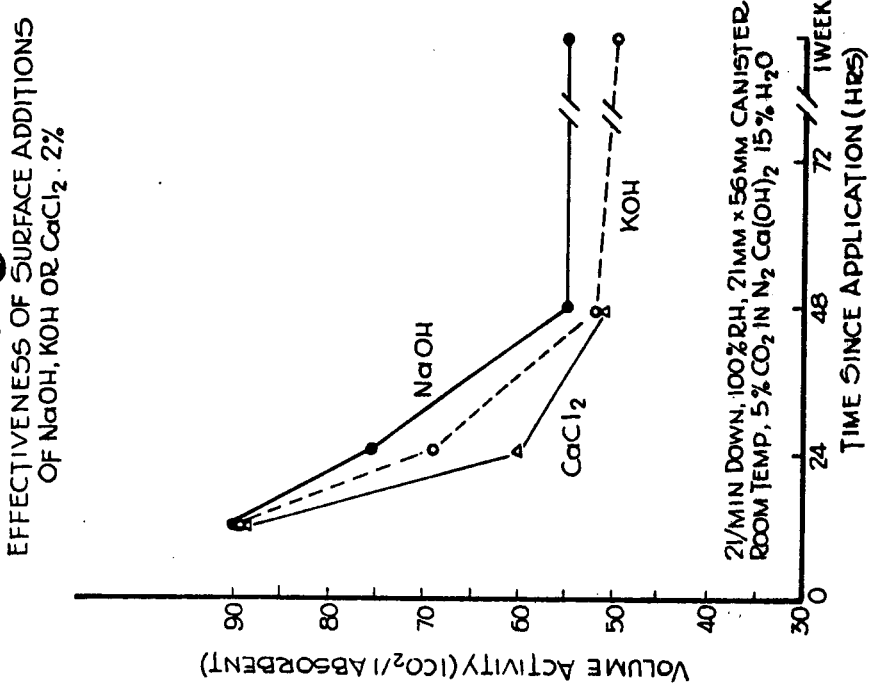
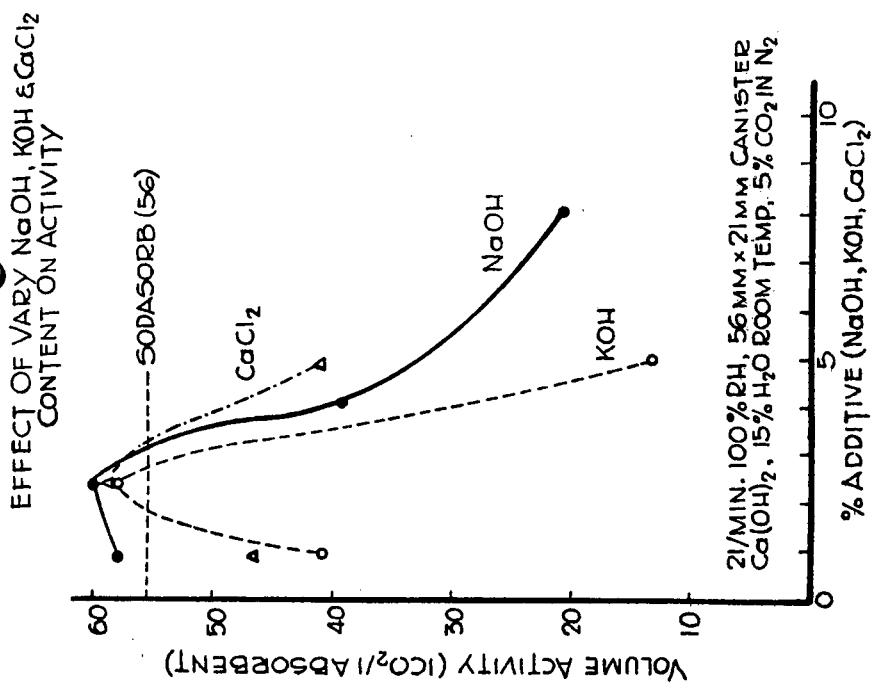

ABSORPTION OF CARBON DIOXIDE

This invention relates to carbon dioxide absorbents, and in particular to a method for making an improved carbon dioxide absorbent material suitable for underwater diving applications.

During World War II, a self-contained diving apparatus was developed to permit undetected approach to enemy vessels. This system involved the recycling of oxygen to minimize the risk of the diver's position being betrayed by bubbles breaking the surface. A recycle loop contained a canister of soda lime to remove carbon dioxide. This system released excess oxygen at a rate of less than 1.5 liters/minute compared with a flow of 35 liters/minute from an open-loop SCUBA system. Today, the use of sodalime in military operations, such as submarines or self-contained diving gear, forms a minor portion of sodalime applications. The major application is in medical anesthetic apparatus and sodalime is now primarily designed around this end use.

$CO_2$ absorbents such as sodalime operate effectively at low breathing gas flows and at room temperature. These materials are used extensively in hospitals during anesthesia to remove carbon dioxide from an unconscious patient's breath during surgery. Under these conditions, typical flow rates are 10–20 l/min at temperatures of about 20° C. However, at higher breathing gas flows of the order of 35 l/min, characteristic of a working diver i.e. a diver swimming underwater at 30–40 m/min, and lower temperatures, about 10° C., the absorptive capacity of existing absorbents is reduced to below acceptable limits.

An acceptable standard is described in Canadian Forces Specification C-87-003-001/SF-000 of Aug. 7, 1975. Generally speaking, to meet this standard, an acceptable absorbent must remove 70 l of $CO_2$ when placed in a Clearance Diver's Breathing Apparatus (CDBA) and subjected to flow rates of 35 l/min, 5% $CO_2$ in $O_2$, 100% Relative Humidity (RH) at 20° C. and cannister at 10° C. The approximate dimensions of the absorbent bed are 5.5 inches in diameter by 2.6 inches in depth.

The volume activity of $CO_2$ absorbents is of interest, since divers are restricted more by the volume of their component rather than weight. Comparing volume activities of various $CO_2$ absorbents, lithium hydroxide, because of its low density, does not perform as well as sodium hydroxide, a much denser material. According to the literature, the most effective compound on a volume basis is sodium hydroxide, followed by Protosorb ® (a $Ca(OH)_2$ based material), lithium hydroxide, and Baralyme ® (a $Ba(OH)_2$ based material).

For application in diving, the compound must not be friable, since dust will pose a health hazard and must have a long shelf-life. Low temperature performance is also crucial, as is low back pressure for ease of breathing. Unfortunately, lithium hydroxide is friable, producing a very irritating dust which necessitates the use of filters. Use of filters increases back pressure and could cause a serious reduction of air flow. Hence, the literature does not indicate a clear-cut choice of a $CO_2$ absorbent suitable for diving applications.

Various additives have been included in $CO_2$ absorbents such as sodalime in attempts to improve its properties. For example sodium hydroxide has been added to improve hardness. Also, calcium chloride has been added as a water control agent. Other additives including potassium hydroxide, calcium carbonate, silicates and calcium sulfate and mixtures thereof, have been employed depending upon the application of the absorbent. One typical sodalime formulation is 1.7% NaOH, 2.5% KOH, 0.2% $CaCl_2$, 5.3% $CaCO_3$, 0.2% $SiO_2$, 0.3% $CaSO_4$, 73% $Ca(OH)_2$ and 17% moisture, manufactured by W. R. Grace and Co. under the trademark Sodasorb. To prepare the final absorbent composition, the additives are generally homogeneously mixed through the primary $CO_2$ absorbent, in this case, $Ca(OH)_2$.

According to the invention, an improved method of making a $CO_2$ absorbent material is provided. The $CO_2$ absorbent comprises a major amount of a compound selected from the group consisting of group IA and IIA metal hydroxides and a minor amount of an additive selected from the group consisting of KOH, NaOH, $CaCl_2$ and mixtures thereof. The improvement comprises providing the additive in solution in water and spraying the additive solution onto said compound to provide a substantially even coating of the additive solution on said compound.

In the drawing which serves to illustrate a preferred embodiment of the invention, FIGS. 1 and 2 are graphs comparing the activities of $CO_2$ absorbents made according to a conventional method and the method according to the present invention, respectively.

FORMULATION OF ABSORBENT

To produce the approximately 1 liter (1.03 L) of absorbent required in a CDBA canister, approximately 1000 grams of pure calcium hydroxide (1.5% impurities) are placed in a shallow pan. Slowly add 600–700 grams (mls) of distilled water, added in increments of approximately 100 ml (and mixed with the calcium hydroxide). After about two-thirds of the water is added, it should be possible to form a ball from most of the calcium hydroxide. The ball will have the consistency of heavy bread dough and should have the remaining water and calcium hydroxide worked into it. This process may take some time, since it is necessary to ensure uniform mixing of the water and calcium hydroxide. Basically, the 60–70%/w water is only enough to ensure thorough and uniform mixing. Below this water content the mass is crumbly and does not hold together. Above this water content the resulting dried calcium hydroxide is not sufficiently dense to provide reasonable resistance to crushing. In fact, the density is lower providing a material of lower volume activity compared to material in this essential water addition range.

The mixture is next extruded through a grate with circular holes four millimeters (4 mm) in diameter. Extrusion is employed to increase density and hardness and provide more thorough mixing. For initial production, a commonly available hand meat grinder was used. The material is extruded into two or three stainless steel drying trays (240×150 mm). If two phases, a liquid surface water film on the solid calcium hydroxide paste is visible, the material is re-extruded.

The extruded material is spread on wire sieves and dried in air for at least twelve hours at about 140° C. Lower temperatures result in water retention, a noticeable problem at temperatures even as high as 110° C. It is possible that longer drying at 110°–115° C. would produce on acceptable material. The material should be absolutely dry or water content in the final product may be too high resulting in reduced efficiency.

The dried material is meshed through a standard 5 mesh sieve over a 8 mesh sieve; fines are caught in a pan below this. This mesh size results in acceptable back pressure in the CDBA canister (4" water @ 35 L/min). Hand meshing is accomplished by reaking the material on the 5 mesh sieve with a ceramic pestle and periodically shaking. Granules passing the 5 mesh and retained on the 8 mesh sieve are saved for further treatment. Generally, the process results in losses through the 8 mesh sieve of one-third of the initial material. If losses are in excess of this amount, it could indicate the granules are not hard enough and may have too low a density to give optimum performance. The granules should be very difficult to crush between thumb and forefinger.

INCLUSION OR ADDITIVES

An additive solution is made up and sprayed onto a charge of the absorbent granules as prepared above. A typical change of absorbent granules and additive solution constitute a standard 1000 g batch.

It has been found that the following range of additives provide a superior $CO_2$ absorbing material.

NaOH—2-3%/w
KOH—1-2%/w
$CaCl_2$—0.1-1%/w

Tests indicate that when these additives reach 5%/w, the absorptive capability of the material falls rapidly.

The additives are dispersed in 15-20%/w water to form a final additive solution. The additives provide water distribution control and provide reaction heat to the charge during carbon dioxide adsorption. A heat of solution is generated during dissolution, and the solution should be stirred until it reaches ambient temperature. Due to the basic nature of the mixture, the calcium chloride may not completely dissolve; and the solution will appear cloudy. The additive solution is then sprayed onto a 75-85%/w charge of absorbent granules using a hand-held mist sprayer to make up a 100%/w batch. This technique requires very little equilibration time, as the solution is evenly applied to the absorbent granules.

By way of specific example, $Ca(OH)_2$ granules, 791 grams, are spread in two stainless steel trays to a depth of approximately 2 cm; and an additive solution consisting of 167 g $H_2O$
27 g NaOH
14 g KOH
1 g $CaCl_2$ sprayed on the surface. The sum weight of granules and a solution constitute a standard 1000 gram batch. During initial tests, the solution is sprayed on, using a plant sprayer. Spray on increments of approximately 25 ml, stirring gently after each addition. After addition of the solution, allow to stand 5-10 minutes to permit water to start absorbing into the granules; also, any excess water on the tray will be taken up by the calcium hydroxide absorbent.

Transfer the sprayed calcium hydroxide granules to an air-tight polyethylene bag and store at cool temperature (4°-20° C.) for two days prior to use. During this two day period, the carbondioxide absorbing ability of the material will change markedly. This is due to initial incomplete absorption of the water and additives into the granules. Based upon experience with various commercial $CO_2$ absorbents it is not advisable to store above room temperature since this would promote water loss.

The most important chemical factor affecting absorbent performance is the water content, especially with regard to calcium hydroxide based materials. In all materials, the control of water content was critical to the performance of the material; and this effect is outlined in Table 1 for each absorbent.

Of all the compounds tested, lithium hydroxide and calcium hydroxide derivatives performed the best. In general, water content is critical to the absorption of $CO_2$ since a minimum amount is required for the basic chemical reaction; however, excess amounts of water will lead to water-logging of the absorbent bed, thus reducing the effective area. The optimum lies between 10 and 20%, the exact value depending on the application.

TABLE 1

| Absorbent | Effect of Water Content on Absorbent Performance |
|---|---|
| | Effect |
| LiOH | Up to ~20% water content no noticeable effect, but at higher water content, performance decreases. |
| NaOH | Impossible to control initial water content. During absorption, water absorbed readily, resulting in high back-pressures and channelling |
| KOH | Very similar to NaOH, but does not absorb water as readily. |
| $Mg(OH)_2$ | No absorption. Adding water had no effect. |
| $Ca(OH)_2$ | Maximum absorption at 15-20% initial water content. Content varies during absorption but can be partially controlled by chemical additives. Generally loses water. |
| $Ba(OH)_2$ | No absorption. Octahydrate had very slightly improved absorption. |
| Molecular Sieve 5A | Humidity poisons absorbent, best with no water present. |

Addition of a non-carbon dioxide reaction substance, such as calcium chloride, resulted in increases in activity almost identical to those obtained by the addition of sodium hydroxide or potassium hydroxide. In all cases, addition of these compounds singly or in combinations resulted in water content increases after use, compared to pure calcium hydroxide. In all cases, where calcium chloride was added in quantities less than four percent, both activity and water content increased compared to calcium hydroxide without the additive.

Addition of these water-control agents can improve absorption for ca calcium hydroxide compounds, given the external operating conditions (i.e. flow, humidity, temperature). For any given set of these conditions, empirical testing could produce an absorbent, using additives to maximize absorption.

EXPERIMENTAL

Tests were run on absorbent materials made by conventional techniques i.e. by homogeneously mixing the individual additives and dry calcium hydroxide and adding water. The proportion of each additive in calcium hydroxide was varied. (FIG. 1). All material had peak activity at 2% additive, and this was true at all flows. Absorbent beds with sodium hydroxide and calcium chloride maintained average water contents of 10-12% at all concentrations. Beds with potassium hydroxide as additive had final water contents of 1-6%. Back pressures for all additives were approximately 10 mm of water. All materials had peak bed temperatures of approximately 45° C., averaging 40° C.

Tests were then carried out to determine the effect of placing additives on the surface of the granule instead of mixing them homogeneously through the granule. When the individual additives (NaOH, KOH, $CaCl_2$) were sprayed onto the calcium hydroxide and tests carried out within twelve hours, very high activities were measured; this decreased with time to seventy-two hours (FIG. 2). After seventy-two hours, the activity remained stable, provided the product was stored in a sealed container. There was no discernable change in final water content or back pressure with activity. The activation recorded in FIG. 2 may be compared to those of FIG. 1 to emphasize the higher activities observed using the spray-on technique.

EFFECT OF ADDITIVES ON ABSORPTION

Addition of sodium hydroxide, potassium hydroxide, or calcium chloride in total concentrations less than approximately five percent resulted in absorption improvement. Absorption for singly tested additives, was greatest at three percent concentrations. This value is correct only if the additive is sprayed on with the water. Additives incorporated during initial formulation cause maximum absorption at much lower percentages.

Tests with combinations of these additives using the spray-on technique were carried out at various flows and temperatures, but always 100% RH at 20° C. At 10° C., the standard product Sodasorb performed poorly, while the copy compound performed much better, as did other additive compounds. The comparison Sodasorb was old, but even the best absorption for fresh Sodasorb was substantially below those found for the additive compounds.

Based on these tests, it appears that a calcium hydroxide based absorbent using sodium hydroxide, potassium hydroxide, and calcium chloride additives can be formulated so that it out-performs Sodasorb. The degree of this improved performance versus the Sodasorb's low temperature performance is given in Table 2. Many products outperformed Sodasorb, and several combinations not mentioned also performed well in single tests. These compounds were all variations of NaOH, KOH, and $CaCl_2$ additives.

Based on these tests, it is possible by chemical means alone to improve low temperature absorption of calcium hydroxide based compounds to out perform Sodasorb.

TABLE 2

Various Calcium Hydroxide Formulations Relative Performance at 10° C.

| Absorbent Formulation | Activity Rate** (Absorbent/Sodasorb) |
|---|---|
| $CA(OH)_2/H_2O/NaOH/KOH/CaCl_2$ 79.1/16.5/1.7/2.5/0.2 | 1.8 |
| $CA(OH)_2/H_2O/NaOH/KOH/CaCl_2$ 79.1/16.7/2.7/1.4/0.1 | 2.0 |
| $Ca(OH)_2/H_2O/NaOH/KOH/CaCl_2$ 80.8/13/3.8/0.0/2.4 | 1.6 |
| $Ca(OH)_2/H_2O/KOH$ 83/15/2 | 1.3 |
| $Ca(OH)_2/H_2O/CaCl_2$ 83/15/2 | 1.6 |

*Based on 21/min down, 10° C., 56 mm × 24 mm canister, 100% RH, 5% $CO_2$ in $N_2$.
**Based only on data where two or more data points show the same trend with no cases of ratio <1. Sodasorb activity = 43.

Various combinations of calcium hydroxide and different sprayed on additives were tested in cold seawater temperatures (10° C.) at various flow rates. The results were surprising in that none of the formulations showed as strong relationship between activity and residence time as did Sodasorb (Table 3). The data are scattered, but the compounds performed consistently better than Sodasorb at short residence times. (i.e. 1.6 and 1.0 seconds) This demonstrates that it is possible by chemical additions alone to improve activity for short residence times and low temperatures compared to Sodasorb.

TABLE 3

Effect of Residence Time on Activity of Several Calcium Hydroxide Mixtures

| Absorbent | Residence Time (seconds) | Activity (1/1) |
|---|---|---|
| $Ca(OH)_2/H_2O/NaOH/KOH/CaCl_2$ 79.1/16.5/1.7/2.5/0.2 | 3.1 | 77 |
| | 1.6 | 79 |
| | 1.0 | 61 |
| $Ca(OH)_2/H_2O/NaOH/KOH/CaCl_2$ 79.1/16.7/2.7/1.4/0.1 | 3.1 | 87 |
| | 1.6 | 86 |
| | 1.0 | 73 |
| $Ca(OH)_2/H_2O/NaOH/KOH/CaCl_2$ 80.8/13/3.8/0.0/2.4 | 3.1 | 42 |
| | 1.6 | 70 |
| | 1.0 | 59 |
| Sodasorb | 3.1 | 81 |
| | 1.6 | 41 |
| | 1.0 | 29 |

24 mm × 56 mm, 100% RH, flow down, ~10° C., 5% $CO_2$ in $N_2$.

Referring again to Tables 2 and 3, it is apparent that the preferred calcium hydroxide based $CO_2$ absorbent formulation is the (79.1/16.7/2.7/1.4/0.1).

Further full scale activity tests on this formulation are as follows.

Tests were run on a full scale system (Volume=1 l, weight absorbent=900 grams) to give activities of 86.4 to 100.3 (three tests) for inlet gas 4.4% $CO_2$ in $O_2$.

In one of these tests (89.5 Volume Activity), about 6% less absorbent was provided than was necessary to fill the canister. If a full charge had been provided the activity is calculated to be 95 $lCO_2/l$ absorbent.

The specific tests are given in Table 4 below.

TABLE 4

| VOL. ACTIVITY ($lCO_2/l$ absorbent) | DENSITY (g/cc) |
|---|---|
| 86.4 | 0.85 |
| 100.3 | 0.84 |
| 89.5 | 0.79 |

For comparison purposes test results for the existing commercial product (Sodasorb by the W. R. Grace Co., Atlanta, Ga.) show an activity of 63.1 to 68.0 (density 0.90 g/cc).

All tests are run at 35 l/min., 10° C., i.e. within the test specification for the Canadian Forces described on page 1. It is thus apparent that for this preferred $CO_2$ absorbent formulation, wherein the additives are sprayed onto the primary $CO_2$ absorbing material, in this case, $Ca(OH)_2$, a considerably higher activity ($lCO_2$ absorbed/l absorbent) than that of Sodasorb, made by conventional techniques, and operating under the same conditions, results.

The embodiments of the invention in which an exclusive property or privilege is claimed are defined as follows:

1. In a method for making a carbon dioxide absorbent material, said absorbent material comprising about 75 to about 85%/w of a compound selected from the group consisting of group IA and IIA metal hydroxides, about 15 to about 20%/w of water and about 3 to about 5%/w of an additive, the improvement comprising (1) providing said additive in solution in water wherein said additive solution comprises about 15 to about 20%/w of water, about 2 to about 3% of NaOH, about 1 to about 2%/w of KOH and about 0.1 to about 1%/w of $CaCl_2$, and (2) spraying said addition solution onto said compound to provide a substantially even coating of said addition solution on said compound.

2. A method according to claim 1, including the additional step of transferring the coated compound to an air-tight enclosure and storing for about two days prior to use at about 4°–20° C. in order to permit stabilization of the activity of the $CO_2$ absorbent material.

3. A method according to claim 1 or 2, wherein the $CO_2$ absorbent material consists essentially of

| | |
|---|---|
| $H_2O$ | 16.7%/w |
| NaOH | 2.7%/w |
| KOH | 1.4%/w |
| $CaCl_2$ | 0.1%/w |
| $Ca(OH)_2$ | 79.1%/w |
| | 100.0%/w |

4. A method for making a carbon dioxide absorbent material, which comprises
  (a) providing substantially pure $Ca(OH)_2$ in an amount of about 75 to about 85%/w;
  (b) adding 60–70% by weight $H_2O$;
  (c) mixing thoroughly until a paste of substantially uniform consistency is achieved;
  (d) drying in air to remove substantially all of the water;
  (e) grinding and screening the dried material to provide granular $Ca(OH)_2$ of average diameter of 5–8 mesh;
  (f) providing an additive solution comprising about 15 to about 20%/w of water, about 2 to about 3%/w of NaOH, about 1 to about 2%/w of KOH and about 0.1 to about 1%/w of $CaCl_2$; and
  (g) spraying said additive solution onto the granular $Ca(OH)_2$ from step (e) while stirring gently to provide a substantially even coating of said additive solution of the $Ca(OH)_2$.

5. A method according to claim 4, including the additional step of extruding the paste from step (c) to increase bulk density.

6. A method according to claim 4, wherein step (d) the drying is effected at about 140° C. for about 12 hours.

7. A method according to claim 4, wherein step (b) about 70% by weight of water is added.

8. A method according to claim 4, including the additional step of transferring the coated compound to an air tight enclosure and storing for about two days prior to use at about 4°–20° C. in order to permit stabilization of the activity of the $Ca(OH)_2$.

9. A method according to claim 4, 5 or 8, wherein the $CO_2$ absorbent material consists essentially of 79.1%/w of granular $Ca(OH)_2$ of mesh size 5–8 from step (e) and an additive solution consisting essentially of 16.7%/w of water, 2.7%/w of NaOH, 1.4%/w of KOH and 0.1%/w of $CaCl_2$.

10. The carbon dioxide absorbent material produced by the process of claim 2.

* * * * *